(12) United States Patent
Cortes

(10) Patent No.: US 9,435,061 B2
(45) Date of Patent: Sep. 6, 2016

(54) DECORATIVE HOLDER

(71) Applicant: Be Empowered International, LLC, West Palm Beach, FL (US)

(72) Inventor: Kimberly K. Cortes, West Palm Beach, FL (US)

(73) Assignee: Be Empowered International, LLC, West Palm Beach, FL (US)

( * ) Notice: Subject to any disclaimer, the term of this patent is extended or adjusted under 35 U.S.C. 154(b) by 314 days.

(21) Appl. No.: 13/779,202

(22) Filed: Feb. 27, 2013

(65) Prior Publication Data

US 2013/0224403 A1 Aug. 29, 2013

Related U.S. Application Data

(60) Provisional application No. 61/603,562, filed on Feb. 27, 2012.

(51) Int. Cl.
| | |
|---|---|
| *A41H 43/00* | (2006.01) |
| *D04D 7/04* | (2006.01) |
| *A47G 33/10* | (2006.01) |
| *D04D 7/10* | (2006.01) |
| *A01G 5/04* | (2006.01) |

(52) U.S. Cl.
CPC *D04D 7/04* (2013.01); *A01G 5/04* (2013.01); *A47G 33/10* (2013.01); *D04D 7/10* (2013.01)

(58) Field of Classification Search
CPC .......... D04D 7/10; D04D 7/00; B65D 85/04; A47G 33/10; A01G 5/04
USPC .................................................. 223/44, 46
See application file for complete search history.

(56) References Cited

U.S. PATENT DOCUMENTS

| | | | |
|---|---|---|---|
| 696,361 A * | 3/1902 | Chase | 223/46 |
| 1,557,506 A | 10/1925 | Walthers | |
| 1,774,390 A * | 8/1930 | McGrath | 132/226 |
| 1,920,551 A | 8/1933 | Daum | |
| 1,925,927 A | 9/1933 | McKain | |
| 2,077,370 A | 4/1937 | Reynolds | |
| 2,542,222 A | 2/1951 | Welch | |
| 2,666,249 A | 1/1954 | Ruiz et al. | |
| 2,763,080 A | 9/1956 | Welch | |
| 3,223,440 A | 12/1965 | Rosenzweig | |
| 3,377,674 A | 4/1968 | Brassaw et al. | |
| 3,428,227 A | 2/1969 | Cavoli | |
| 3,449,197 A | 6/1969 | Molinaro | |
| 3,501,070 A | 3/1970 | Shattuck | |
| 3,632,464 A | 1/1972 | Grikis | |

(Continued)

FOREIGN PATENT DOCUMENTS

| | | |
|---|---|---|
| GB | 496512 | 12/1938 |
| GB | 2227048 | 7/1990 |

*Primary Examiner* — Nathan Durham
(74) *Attorney, Agent, or Firm* — McHale & Slavin, P.A.

(57) ABSTRACT

A decorative material holder formed from a single piece structure having a series of equally spaced apart cavities formed by a series of upper and lower U-shaped bends in a sinuous shape. The cavities allow for the support of ornamental items, as well as facilitate and ease the making of ribbon bows. The material holder has a proximal end and a distal end extending a distance beyond the lower U-shaped bends. The ends are used in securing the decorative holder to items such as a Christmas tree or decorative wreath, for placement over two spaced apart elements such as two Christmas tree branches, or attached between an outer and inner circular ring to form a wreath template.

5 Claims, 9 Drawing Sheets

(56) References Cited

U.S. PATENT DOCUMENTS

| | | |
|---|---|---|
| 3,854,179 A | 12/1974 | Montoya |
| 3,993,205 A | 11/1976 | Pilchard |
| 4,337,578 A | 7/1982 | Seals |
| 4,454,968 A | 6/1984 | StLawrence |
| 4,515,837 A | 5/1985 | Cheng |
| 4,629,100 A | 12/1986 | Owens |
| 5,100,706 A | 3/1992 | Zaweski |
| 5,215,791 A | 6/1993 | Davignon |
| 5,422,288 A | 6/1995 | Neilson et al. |
| 5,499,759 A * | 3/1996 | Richards ............ 223/46 |
| 5,509,586 A | 4/1996 | Leiser |
| D374,306 S * | 10/1996 | Query ............ D28/10 |
| 5,617,979 A | 4/1997 | Cavender |
| 5,810,214 A | 9/1998 | Hecht |
| 6,618,913 B2 | 9/2003 | Notomi |
| 6,681,965 B1 | 1/2004 | Tran |
| 2009/0294490 A1 * | 12/2009 | Gustin ............ 223/46 |

* cited by examiner

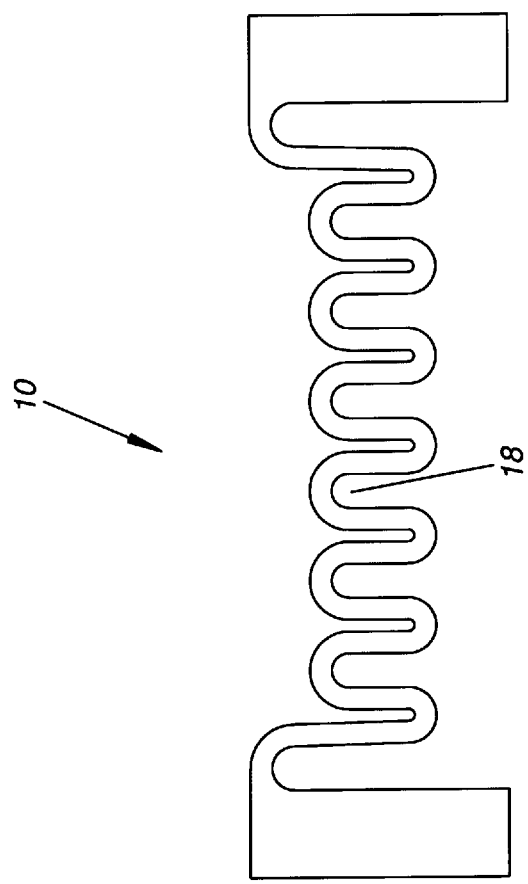

DECORATIVE HOLDER

PRIORITY CLAIM

In accordance with 37 C.F.R. 1.76, a claim of priority is included in an Application Data Sheet filed concurrently herewith. Accordingly, the present invention claims priority under 35 U.S.C. §119(e), 120, 121, and/or 365(c) to U.S. Provisional Application No. 61/603,562, entitled "DECORATIVE HOLDER", filed Feb. 27, 2012. The contents of which the above referenced application is incorporated herein by reference.

FIELD OF THE INVENTION

The present invention relates in general to decorative holders and more particularly to a device for use in securing ribbons, flowers, and like materials between two elements, such as Christmas tree branches and wreaths.

BACKGROUND OF THE INVENTION

Hanging various ornamental materials to a fixed element is well known. For instance, Christmas trees are commonly decorated with ornaments used to celebrate during the holiday season, and wreaths are commonly used for most any occasions from funerals to holidays. Decorations are personal, trees and wreaths become a representation of the decorator and his/her family. Decorations range from hand-made ornaments made by the children to ornaments collected over time. Ornaments take many different forms, from a simple round ball to highly artistic designs. Ornaments are almost always reused year after year, rather than purchased annually, and family collections often contain a combination of commercially produced ornaments and decorations created by family members. Such collections are often passed on and augmented from generation to generation. Ornaments are more than just decorative pieces, they often have symbolic meaning. For instance, a wreath is a symbol of the never ending eternal value of love, a fir tree shows everlasting light and life, and a bow tied together shows bonds of goodwill. Some trees are decorated with a color theme in mind, mainly red to symbolize sacrifice for all. One of the best ways to give a tree or a wreath a traditional appearance is to tie beautiful bows on it.

Bow making has long been recognized as an art, and substantial skill is generally required to manually tie well proportioned decorative bows. Automation of the bow making industry has given rise to complex machinery for producing decorative bows, but such machinery is expensive and takes originality, creativity, and enjoyment out of the personal bow making process. Attempts have been made to devise bow making devices that are inexpensive, but they too tend to limit the bow maker's creativity by dictating the resulting bow configuration. Examples of such devices are disclosed in the following U.S. Pat. Nos. 4,515,837; 2,077,370; 2,542,222; 2,666,249; 2,763,080; 3,223,440; 3,428,227; 3,501,070; 4,454,968; 4,629,100; 3,632,464; 5,422,288; 5,617,979; 5,810,214; 6,618,913; 6,681,965; 3,377,674; 3,854,179; 4,337,578; 5,100,706; and 5,215,791.

Unfortunately, the beautiful pre-made bows often come with a hefty price and restrict originality and creativity. Thus for cost effective reasons, beautiful and traditional bows constructed of ribbon are tied by hand. Ribbon is a thin band of material, typically cloth but also plastic or sometimes metal, used primarily as decorative binding and tying. Ribbon is used for innumerable useful, ornamental, and symbolic purposes. Two considerations to remember when making a bow is where will the bow be used and of what material will it be constructed of. Satin ribbon is inexpensive, very easy to handle, and excellent to learn with. While perhaps more attractive, velvet ribbon can be difficult for a first time bow tying experience. Wired ribbon is often the preferred ribbon product. It has a thin line of wire on either side of the ribbon and tends to be much easier to shape into a perfectly made bow which will retain its shape much better after all the twisting and folding is done.

Bows are a sought after accent to wreaths and Christmas trees and many other home decor applications. A simplistic approach to making a bow includes starting with a large loop made by pinching the ribbon and leaving the tail as long as desired, then forming additional loops continuously until the bow reaches the desired fullness while leaving enough ribbon to make the second tail, and finally securing the bow with craft wire. However, hand-made bow making craft is not as simplistic as might be thought or desired. Crafters often become frustrated with the technique despite its simplicity. When making a bow with multiple loops the crafter must maintain a pinch grip on each of the loop ends. Every time a new loop is to be formed the pinch grip is relaxed for a split second and the new loop end is then pressed together with those already formed. Unfortunately, letting go of the pinch grip for even a split second sometimes causes the already formed loops to fall apart, making the experience very frustrating. Also, in continually pinch gripping and letting go the tautness in the loops is compromised and the bows may lose some of their fullness. It is thus desirable to provide a device for quickly making a ribbon bow while alleviating the drawbacks normally associated with bowing making by hand.

If one is taking the time to buy or make and collect beautiful holiday ornaments for display, it is also important to hang them to their best advantage. There are numerous hangers and hooks to choose from. So considerations in selecting a product includes: functionality, decorative affect, ease of use, time required for application, and cost. However, perhaps the most important consideration is that the item or items can be held securely. Christmas tree ornaments are typically provided with an opening into which a string, ribbon, or metal hanger is used in hanging the ornament in place. The string or ribbon would be tied to a branch of the Christmas tree, while the metal hanger is merely hung from a branch. Strings and ribbons may be colorful thus adding to the decor to the Christmas tree, but are time consuming to apply when affixing the ornament to a branch. Also, they must then later be untied when removing ornaments from the tree after the holidays. Metal hangers usually include a large top hanging hook that can be bent around the tree branch, while the bottom loop is attached to the ornament. Metal hangers are easier to attach to a branch, but tend to become easily uncoupled from an ornament or unhooked from the branch if the ornament suspended from the hanger is inadvertently bumped. In addition, metal hangers are very visible and often of a dull gray color so that they do little to improve the aesthetic appearance of the ornamentation on a tree. It is thus desirable to have a cost-effective colorful decorative hanger with sufficient tensile strength to prevent the occurrences noted above.

Conventional ornaments vary as widely as one's imagination, but typically the vast majority are to be suspended from a tree branch. While the style of ornament may vary, the weight of the ornament must be such that it will not place undue strain upon the tree branch. For this reason ornaments are typically made of extremely lightweight materials, which translates into fragility. For instance, while a glass ornament provides a very festive and shiny decorative appearance, a normal piece of glass weighs so much that if placed on the end of branch it could cause it to snap. Or should the branch merely sag excessively, the ornament may well slide off the branch, drop to the floor, and break. For this reason such glass ornaments are often made from a wafer thin wall that leaves them light but fragile. The limiting factor is the strength of a Christmas tree branch and how much weight it can support.

It would be desirable to employ a holding device that easily attaches to one or more supporting elements, such as one or more branches, so as to be unobtrusive yet remains affixed to the supporting element even when itself supports one or more ornaments of varying weights or cluster. The holding device could further function as a device with which a decorative ribbon could be quickly made and then retained.

SUMMARY OF THE INVENTION

A decorative material holder formed from a single piece structure having a series of equally spaced-apart cavities formed by upper and lower U-shaped bends placed into a sinuous shape. The cavities allow for the support of ornamental items, as well as facilitate in the making of ribbon bows. The material holder has a proximal end and a distal end extending a distance beyond the lower U-shaped bends. The ends are used in securing the decorative holder to items such as a Christmas tree branch, for placement over two spaced apart elements such as two Christmas tree branches, or attached between an outer and inner circular ring to form a wreath template.

Accordingly, it is the primary objective of the instant invention to provide a material holding device that can support decorative materials, such as clusters of various ornamental attachments and/or ribbons, on one or between two supporting elements.

It is further an objective of the instant invention to provide a material holding device that can span the distance between two elements, such as Christmas tree branches, and support decorative ornamental materials thereon.

Still another objective of the instant invention to provide a material holding device that can be attached to supporting elements without the use of fasteners.

It is yet further an objective of the instant invention to provide a holding device that attaches various ornamental items, ribbons, foliage, pine cones, candy canes, and so forth, forming a colorful cluster that can be attached to a Christmas tree branch.

It is still another objective of the instant objective to provide a holding device that has sufficient tensile strength, approximately 13 gauge, to retain heavier ornaments or clusters thereof.

Another objective of the invention is to provide a holding device that can span a distance between two elements, such as Christmas tree branches, and support decorative materials between the elements.

Yet another objective of the instant invention is to provide a holding device that is constructed from malleable wire or plastic that allows for ease of adjustment to fit various element shapes that it will be secured too. The holding device includes a proximal and distal end that depends from the bottom edge of spaced apart cavities and is sized to allow for attachment to dissimilar shaped supporting elements.

It is yet another objective of the instant invention to provide a holding device having a plurality of cavities for use in making bows. A method of making a bow comprising the steps of: taking a ribbon and passing it through a first cavity and forming a first outwardly projecting loop; then weaving the ribbon snuggly about the next cavity; then swooping the ribbon through a successive cavity and forming a second outwardly projecting bow; continuing this method until a desired number of bows are formed; and then pulling the ribbon through the last cavity. Thus alleviating the frustration associated with pinching and grasping loop ends when making a plurality of bow loops by hand.

It is a still further objective of the instant invention to provide a kit for forming a wreath template. The kit includes a pair of circular rings, a coupling element, and a plurality of material holding devices. The pair of circular rings is comprised of an inner and outer ring, whereby the inner ring has a smaller diameter than the outer ring. The pair of rings are spaced apart and coupled together using a plurality of coupling elements that maintain an equal distance between the rings as well as a sturdy union. The plurality of holding devices are intermittently dispersed along the first and second rings on their proximal and distal ends. The holding devices can be angled along the circular rings. The wreath template allows for the holding and attachment of ornamental clusters or bows on the holding devices along the entire length of the rings.

Other objects and advantages of this invention will become apparent from the following description taken in conjunction with any accompanying drawings wherein are set forth, by way of illustration and example, certain embodiments of this invention. Any drawings contained herein constitute a part of this specification and include exemplary embodiments of the present invention and illustrate various objects and features thereof.

BRIEF DESCRIPTION OF THE DRAWINGS

FIG. 10 is a top plane view of an alternative embodiment of the decorative holder of the instant invention

DETAILED DESCRIPTION OF THE PREFERRED EMBODIMENT

Figure 1:
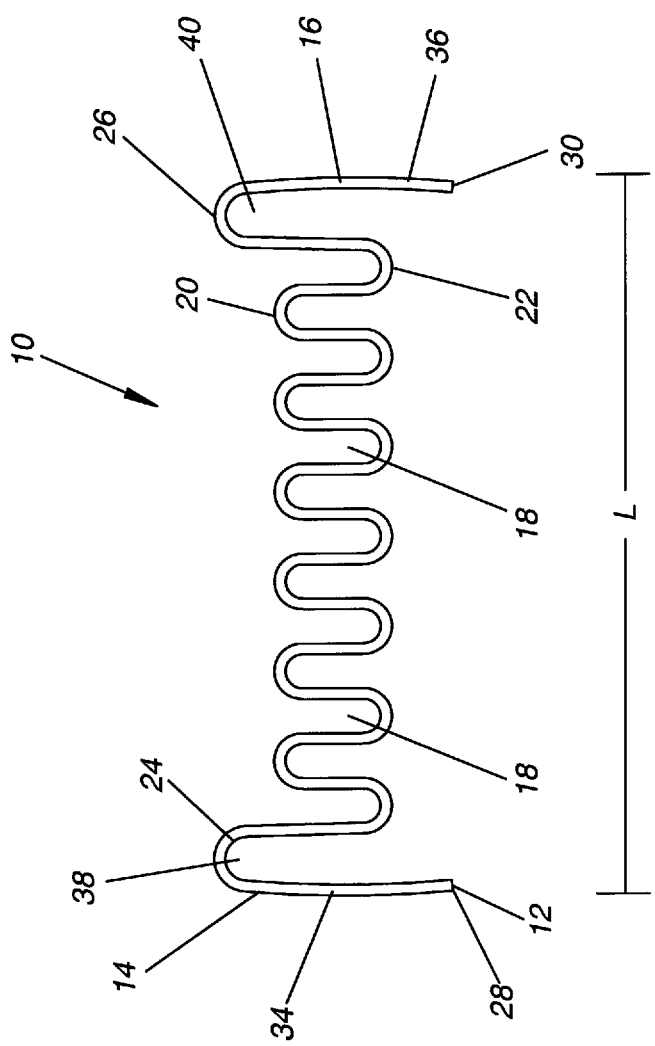
FIG. 1 is a top plane view of the decorative holder of the instant invention.

Now referring to FIG. 1, set forth is a first embodiment of the decorative holder 10 formed from a single piece of wire 12. The size of the wire 12 is similar to that of a conventional coat hanger wire and can be coated with paint or plastic to provide for an anesthetic pleasing appearance as well as making the decorative holder non-marring, not shown. The wire 12 need not be circular and may be formed from most any shape or diameter that allows it to maintain a preselected shape. The wire 12 has sufficient tensile strength, approximately 13 gauge, to retain heavier ornaments, or other items, or clusters thereof. The decorative holder 10 has a proximal end 14 and a distal end 16 with a plurality of equally spaced cavities 18 formed thereinbetween by a series of upper and lower U-shaped bends, 20 and 22, respectively, in a sinuous pattern along a length L of the wire 12. In the preferred embodiment, shown in FIGS. 1 and 2, the cavities 18 are spaced apart approximately 0.2 inches apart and as illustrated, consists of six upper U-shaped bends 20 and seven lower U-shaped bends 22. The distance between the upper U-shaped bends 20 and the lower U-shaped bends 22 is about 0.75 inches. The number of cavities need not be limited to six upper U-shaped bends and seven lower U-shaped bends.

Figure 2:
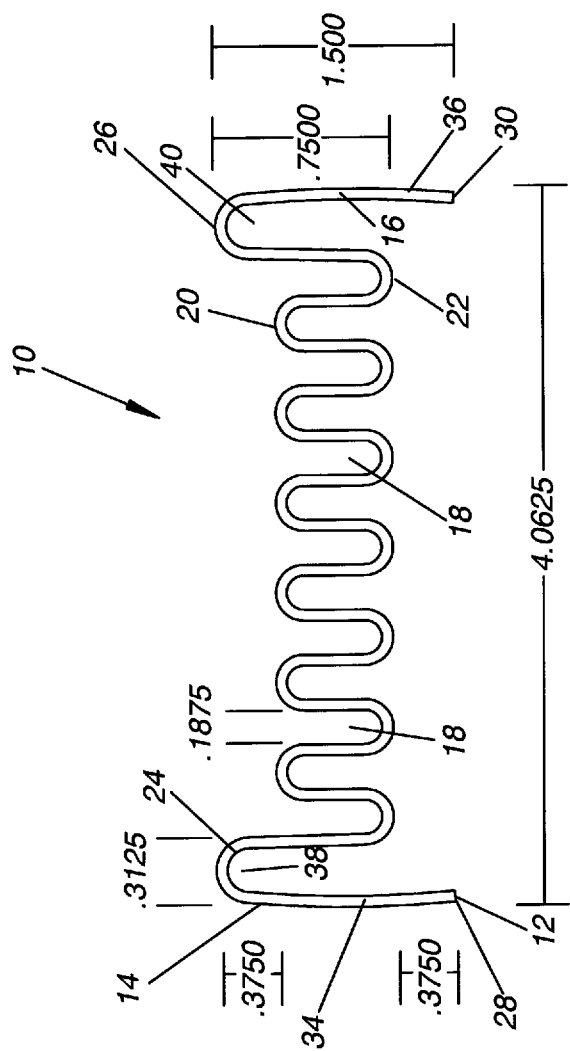
FIG. 2 is a top view having dimensions of the preferred embodiment of the instant invention.

As shown in FIGS. 1 and 2, the proximal end 14 includes a lower tip 28 that extends along a first extension 34 to upper proximal end 24. The upper proximal end 24 extends a distance beyond the upper U-shaped bend 20. The lower tip 28 is spaced apart from the first cavity 18 along upper proximal end 24 by an additional length of approximately 0.5 inch. From the lower tip 28 of the proximal end 14 to the upper proximal end 24 is about 1.5 inches. Similarly, the distal end 16 includes a lower tip 30 that extends along a second extension 36 to second upper U-bend 26. The second upper U-bend 26 extends a distance beyond the upper U-shaped bend 20. The lower tip 30 is spaced apart from the first cavity 18 along upper distal end 26 by an additional length of approximately 0.5 inch. From the lower tip 30 of the distal end 16 to the upper distal end 26 is about 1.5 inches. The proximal end 14 and the distal end 16 are spaced apart from the cavities 18 allowing the material to frictionally engage the cavities formed along the approximately 4 inches long width as defined by the spaced distance between the proximal end 14 and the distal end 16. It is important to note that the structure is bendable so as to conform to a particular shape desired by the consumer yet maintain a pliable and resilient shape which allows the decorative material holder to further grasp separated items in a biasing manner. As noted, the holding device is constructed from malleable wire or plastic that allows for ease of adjustment to fit the various element shapes it will be secured too. The proximal and distal end are sized to allow for attachment to dissimilar shaped supporting elements. The proximal end 14 and distal end 16 is used in securing the decorative holder to items such as directly to a Christmas tree, for placement over two spaced apart elements such as two Christmas tree branches, or attached between an outer and inner circular ring to form a wreath template, more aptly shown in FIGS. 6-7.

Figure 3:
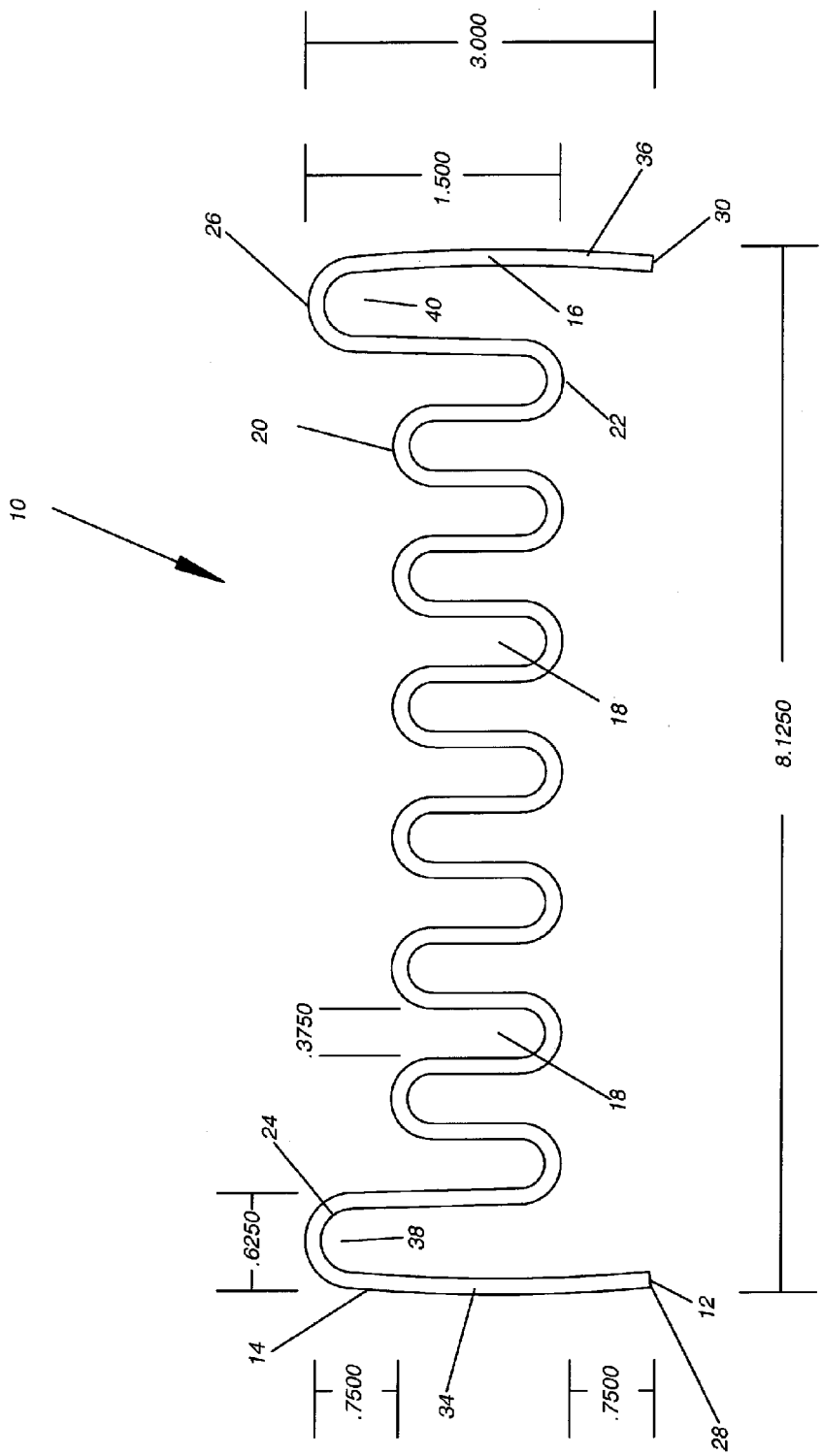
FIG. 3 is a top view having dimensions of the secondary embodiment of the instant invention.

In a secondary embodiment shown in FIG. 3, the cavities 18 are spaced apart approximately 0.4 inches apart and as illustrated, consists of six upper U-shaped bends 20 and seven lower U-shaped bends 22. The distance between the upper U-shaped bends 20 and the lower U-shaped bends 22 is about 1.5 inches. The number of cavities 18 need not be limited to six upper U-shaped bends 20 and seven lower U-shaped bends 22. The proximal end 14 includes a lower tip 28 that extends along a first extension 34 to upper proximal end 24. The upper proximal end 24 extends a distance beyond the upper U-shaped bend 20. The lower tip 28 is spaced apart from the first cavity 18 along upper proximal end 24 by an additional length of approximately 1.0 inch. From the lower tip 28 of the proximal end 14 to the first upper end 24 is about 3.0 inches. Similarly, the distal end 16 includes a lower tip 30 that extends along a second extension 36 to upper distal end 26. The upper distal end 26 extends a distance beyond the upper U-shaped bend 20. The lower tip 30 is spaced apart from the first cavity 18 along upper distal end 26 by an additional length of approximately 1.0 inch. From the lower tip 40 of the distal end 16 to the upper distal end 26 is about 3.0 inches. The proximal end 14 and the distal end 16 are spaced apart from the cavities 18 allowing the material to frictionally engage the cavities formed along the approximately 8.0 inch long width as defined by the spaced distance between the proximal end 14 and the distal end 16.

Figures 6, 7:
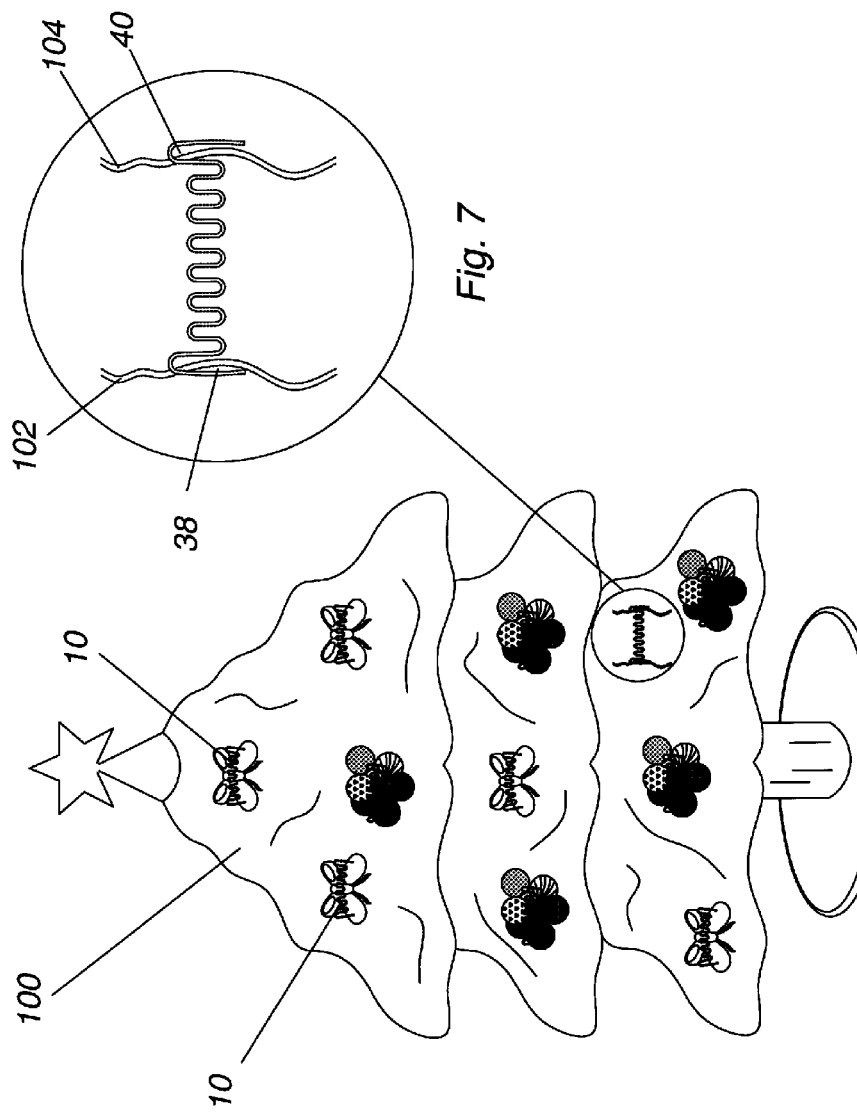
FIG. 6 is pictorial view of a Christmas tree illustrating the placement of the decorative holders.
FIG. 7 is an enlarged view of a portion of FIG. 4 illustrating the decorative holder in between two tree branches.

As shown in FIGS. 1, 6, and 7, in operation the proximal end 14, which forms a holding gap 38 between the first extension 34 and the first cavity 18, can be placed over a fixed element such as a Christmas tree branch. Similarly the distal end 16, which forms a second holding gap 40 between the second extension 36 and the last cavity 18, can be placed over the same element thereby expanding a length of the branch, not extending length L, or over an adjoining Christmas tree branch thereby tying two branches together. The cavities 18 are then made available to support material thereinbetween, either while placed on the tree or when the material(s) are placed in the cavities before the decorative holder is secured to a tree. Most any type of material can be placed between the cavities, such as flowers, beads, ornaments, round balls, ribbon, alpine cones, or the like. Besides Christmas trees, the decorative holder has an application for use with wreaths, shower curtains, belts, cabinets, shoes, lampshades, hair, lamps, flowers, hair bands, plants, picture frames, furniture, cords, lights, jewelry, baskets, napkins, clothing, hand bags, purses, hats, pillows, boxes, jars, cans, lunchboxes, candles, scarves, pins, pens, pencils, and so forth. For instance, the decorative holder can be placed over the edge of a lamp shade wherein the proximal and distal ends are placed on the back side of the shade and the sinuous wave with elements positioned on the front side of the shade.

Figure 4:
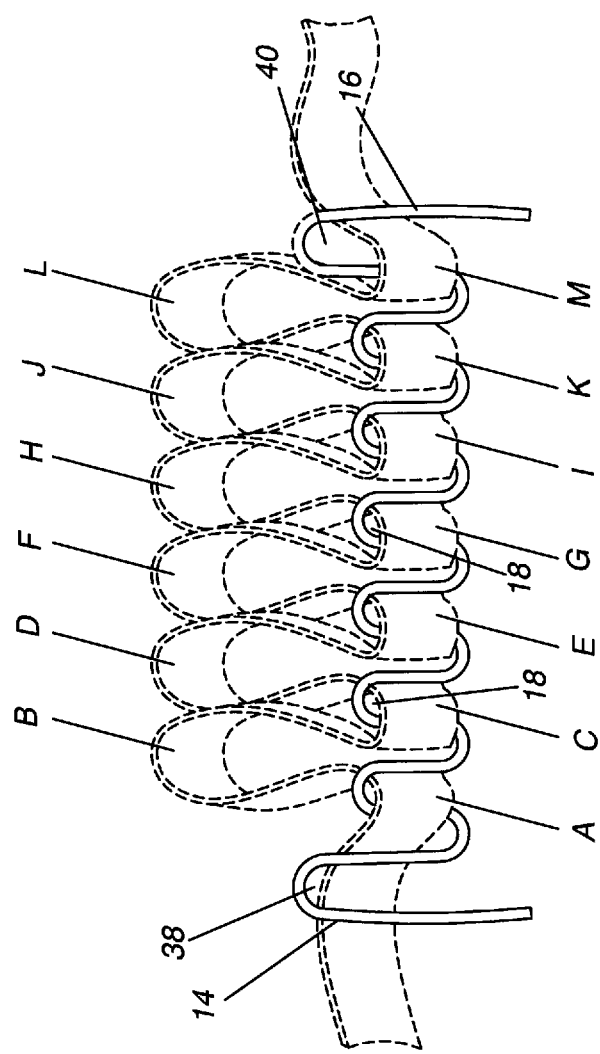
FIG. 4 is a perspective view of the decorative holder including a ribbon within the cavities.
Figure 5:
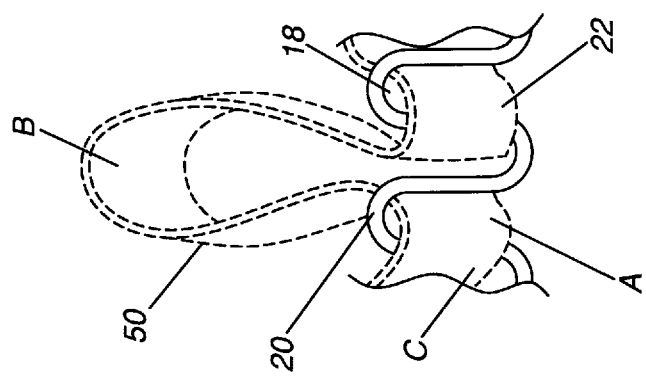
FIG. 5 is a perspective view of the decorative holding including a ribbon being weaved through a cavity.

By way of example, shown in FIGS. 4 and 5, a ribbon can be drawn from through the front of the holder by placement between a first cavity, and drawn back through the cavity to the back of the holder and looped back and forth throughout the cavities giving the ribbon the appearance of a bow in a manner that can be easily assembled or disassembled to meet the consumers objective. Set forth is the decorative holder 10 illustrating the proximal end 14 and distal end 16 with a ribbon 50 that is inserted through the first cavity 18 and weaved about the lower U-shaped bend 22 providing a rear loop A, which snuggly wraps the wire 12, then the ribbon is outwardly swooped around the upper U-shaped bend 20 of the second cavity providing an outwardly projecting bow loop B, followed inserting the ribbon through the third cavity 18 and weaved about the lower U-shaped bend 22 providing a rear loop C, which snuggly grasps the wire 12, then the ribbon is outwardly swooped around the upper U-shaped bend 20 of the fourth cavity providing an outwardly projecting bow loop D. The weaving of the ribbon through alternating cavities 18 provides loops, of outward and rear projection, through points A through M, ending along the distal end 16. It is noted that when the ribbon is weaved in and out through alternating successive cavities 18, and in and out of the upper and lower U-shaped bends, the ribbon provides a very tight bunching of material. It is the preference of the user to decide the number of outwardly projecting bow loops. As shown in FIGS. 4 and 5, the method of making a bow more specifically comprises of: taking the ribbon 50 and passing it through and around the first cavity 18; weaving the ribbon 50 under and over the lower U-shaped bend 22 to create a rear loop A. The weaving of the ribbon 50 about the lower U-shaped bend 22 wraps the ribbon 50 thereabout and creates frictional contact with the wire 12. The ribbon is then outwardly swooped around the upper U-shaped bend of the second cavity 2 to create a first outwardly projecting bow B. Again, the ribbon wraps around the upper U-shaped bend and creates frictional contact with the wire 12. The ribbon is then passed through and around the third cavity 18; weaving the ribbon 50 under and over the lower U-shaped bend 22 to create a rear loop C. This pattern is continued until a desired number of loops are formed or cavities are no longer available. The ribbon is then pulled through the second holding gap 40 on the distal end 16. This method of creating a bow alleviates the frustration associated with pinching and grasping loop ends when making a plurality of bow loops by hand. It should be noted that the ribbon need not pass through each successive cavity, the ribbon can be weaved through alternating cavities. The preference would be dependent upon the number of bows preferred by the user. Additionally, the first loop need not be a rear loop as shown, it is contemplated that an outwardly projecting bow could be the first loop, dependent on the preference of the user, so long as the ribbon is continuously weaved in and out of successive cavities to maintain frictional contact with the wire to not allow the ribbon to fall out.

Once the ribbon is formed the proximal end 14 and the distal end 16 can be placed over the tree branches so as to span a distance between the branches with the ornamental display now positioned between the branches, as opposed to hanging from a single branch. This is particularly advantageous to address those trees that have a less than perfect shape consisting of non-uniform branch formation. The device can be used to correct trees having non-uniform unsightly spacing between branches by providing a brace between such branches thereby further concealing the appearance of a gap or hole any hole in the tree. While a ribbon 50 is used to demonstrate a possible use for the holder, any combination of materials can be attached to the holder including ornaments, presents, characters, candy, pine cones, and so forth.

Now referring to FIG. 6, set forth is a pictorial view of a Christmas tree 100 having decorative holders 10 placed on the tree with various colors of ribbons attached to the decorative holder 10 in accordance with the previous description. In addition, decorative holders 10 may secure various other materials such as flowers, beads, trinkets or combinations thereof, again with the primary purpose of using the decorative holder 10 positioned between elements, such as Christmas tree branches, that are spaced apart. The Christmas tree 100 may include conventional round ornaments shown attached individually to branches along the tree. In addition, the decorative holder 10 may be used to simply space apart the branches as shown in FIG. 7, wherein a first branch 102 is shown placed within first holding gap 38 along element proximal end 14 spaced apart from branch 104 placed within second holding gap 40 and distal end 16, the cavities 18 formed between the proximal and distal end could be expanded or compressed based upon the type of material employed to further control spacing between the branches. The coating on the decorative holder may be of festive or holiday colors if the holder is made as a backdrop to the ornamental display. Alternatively, the holder can be made of a color so as to be inconspicuous if its primary function is for spacing of the tree branches. As previously described the use of the decorative holder allows support of materials along a single branch or between branches, thus the spacing of the cavities can be expanded or contracted when a steel wire foundation is employed. Although the primary purpose of the invention is to operate as a holder for ribbons on Christmas trees, the decorative holder can be placed on most any item to enhance the item's decorative appearance. For instance the device can be hooked over a lamp shade, it can be placed in the hair of an individual, and it can be positioned over the edge of a basket, and so forth. The list of applications previously stated is for illustrative purposes only, the actual use is only limited by ones imagination.

Figure 8:
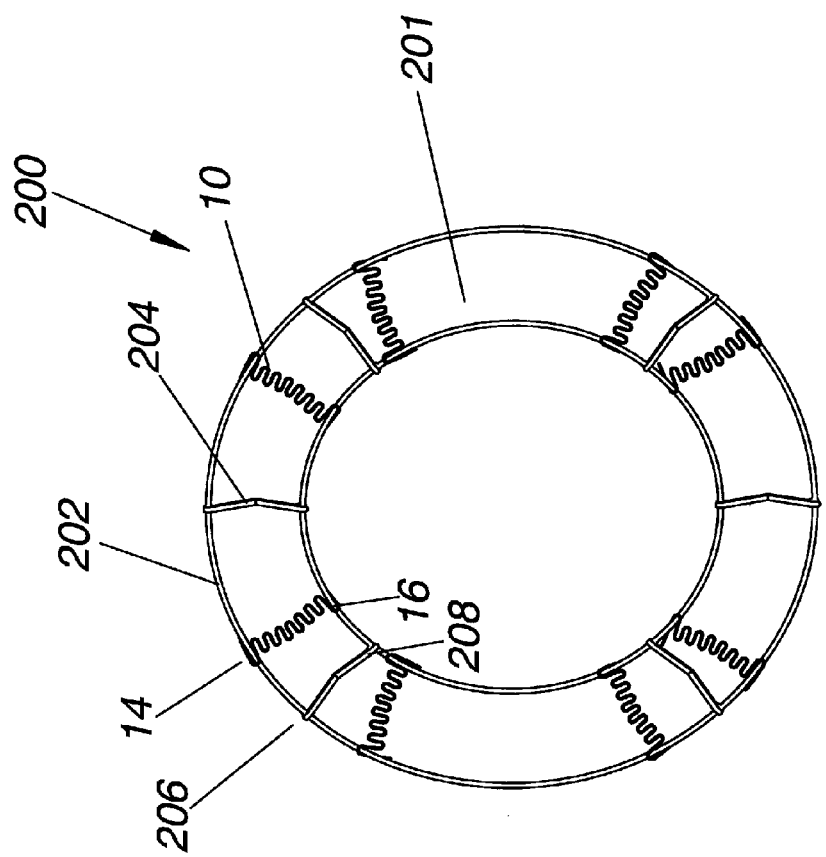
FIG. 8 is a top view of the wreath template.
Figure 9:
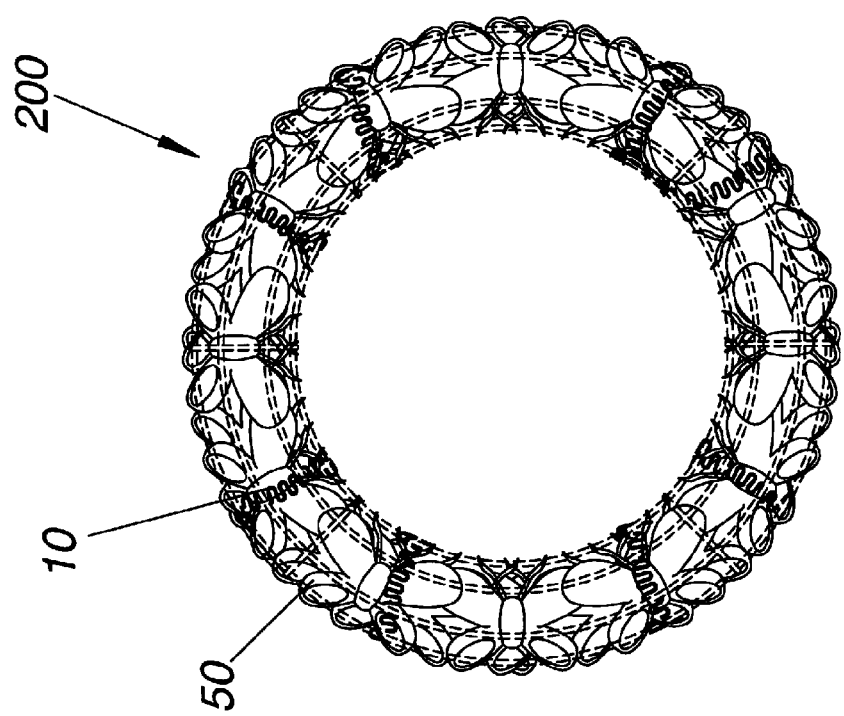
FIG. 9 is a top view of the wreath template having a plurality of bows attached to the decorative holder.

In another embodiment, the invention comprises of a kit for forming a wreath template 200, as shown in FIGS. 8 and 9. The kit includes a pair of circular rings 201 and 202, a coupling element 204, and a plurality of decorative holding devices 10. The pair of circular rings is comprised of an inner ring 201 and outer ring 202, whereby the inner ring 201 has a smaller diameter than the outer ring 202. The pair of rings, 201 and 202, are spaced apart and coupled together using a plurality of coupling elements 204 that maintain an equal distance between the rings while providing a sturdy union. Each coupling element 204 includes a C-shaped bends 206 on the top end 208 and the bottom end 210. The top and bottom C-shaped bends, 206 and 208, are sized to fit about the width of the inner and outer circular rings, 201 and 202. The plurality of decorative holders 10 are intermittently dispersed along the inner and outer rings, 201 and 202, on their proximal and distal ends 14 and 16. The decorative holders 10 can be angled along the circular rings. As shown in FIG. 9, the wreath template 200 allows for the holding and attachment of ribbon bows 50 or ornamental clusters, not shown but discussed above, on the decorative holder along the entire length of the rings. Additionally, for greater strength and integrity it is contemplated that a plurality of circular rings can be used in the wreath template 200 as shown.

Although a metallic alloy is the preferred material, the decorative holder 10 is contemplated as being formed from a flexible piece of plastic, shown in FIG. 10. In a similar fashion as previously described, the cavities 18 are receptive to the placement of materials thereinbetween for the purpose of spanning the space between elements such as a tree branches or for hanging over the edge of items such as lamp shades. The ribbon can again be placed between the cavities 18 or be spaced apart depending upon the desire of the consumer for the width of the ribbon setting. The plastic can even be transparent providing an invisible holder. It should be noted that the thin plastic embodiment allows for an inexpensive decorative holder although one limited in extension and compression strength. For this reason the application may be more suited for attachment to elements having a backing or for holding of lightweight materials.

Detailed embodiments of the instant invention are disclosed herein, however, it is to be understood that the disclosed embodiments are merely exemplary of the invention, which may be embodied in various forms. Therefore, specific functional and structural details disclosed herein are not to be interpreted as limiting, but merely as a basis for the claims and as a representation basis for teaching one skilled in the art to variously employ the present invention in virtually any appropriately detailed structure.

All patents and publications mentioned in this specification are indicative of the levels of those skilled in the art to which the invention pertains. All patents and publications are herein incorporated by reference to the same extent as if each individual publication was specifically and individually indicated to be incorporated by reference. It is to be understood that while a certain form of the invention is illustrated, it is not to be limited to the specific form or arrangement herein described and shown. It will be apparent to those skilled in the art that various changes may be made without departing from the scope of the invention and the invention is not to be considered limited to what is shown and described in the specification and any drawings/figures included herein.

One skilled in the art will readily appreciate that the present invention is well adapted to carry out the objectives and obtain the ends and advantages mentioned, as well as those inherent therein. The embodiments, methods, procedures and techniques described herein are representative of the preferred embodiments and intended to be exemplary and not intended as limitations on the scope. Changes therein and other uses will occur to those skilled in the art which are encompassed within the spirit of the invention and are defined by the scope of the appended claims. Although the invention has been described in connection with specific preferred embodiments, it should be understood that the invention as claimed should not be unduly limited to such specific embodiments. Indeed, various modifications of the described modes for carrying out the invention which are obvious to those skilled in the art are intended to be within the scope of the following claims.

What is claimed is:

1. A method of forming a decorative ribbon consisting:
   forming a decorative material holder from single piece flexible wire shaped structure having a proximal end and a distal end with a plurality of equally spaced apart cavities formed through a series of upper and lower U-shaped bends with a sinuous shape thereinbetween, said proximal end and said distal end extending a distance beneath said lower U-shaped bends;
   weaving a ribbon material through each said cavity and extending said ribbon material a distance outwardly from each said cavity;
   taking said ribbon material and passing it through and around a first cavity on said proximal end;
   weaving said ribbon material under and over said first cavity about said lower U-shaped bend to create a rear loop, which snuggly grasps said single piece structure;
   outwardly swooping said ribbon material about the upper U-shaped bend on successive cavity to create a first outwardly projecting bow;
   weaving said ribbon material under and over the following successive cavity about said lower U-shaped bend to create a secondary rear loop, which snuggly grasps said single piece structure;
   outwardly swooping said ribbon material about the upper U-shaped bend on successive cavity to create a second outwardly projecting bow;
   continuing the same until a desired number of outwardly projecting loops are formed;
   pulling said ribbon material through a last cavity on said distal end holding gap; and
   securing said proximal end and said distal end to a fixed object for supporting said decorative material holder thereinbetween.

2. The method of forming a decorative ribbon of claim 1 wherein said decorative flexible wire shaped structure has a distance of between about 1.5 inches and 3 inches between a lower edge of the distal end to an upper edge of the distal end.

3. The method of forming a decorative ribbon of claim 1 wherein said decorative flexible wire shaped structure has a distance of between about 1.5 inches and 3 inches between a lower edge of the proximal end to an upper edge of the proximal end.

4. The method of forming a decorative ribbon of claim 1 wherein said decorative flexible wire shaped structure has a length of between about 4 inches and 8 inches between the distal end and the proximal end.

5. The method of forming a decorative ribbon of claim 1 wherein said plurality of cavities are spaced apart between 0.1875 inches and 0.375 inches.

* * * * *